United States Patent [19]
Twardowska et al.

[11] Patent Number: 5,743,953
[45] Date of Patent: Apr. 28, 1998

[54] HEAT CURABLE ALUMINO-SILICATE BINDER SYSTEMS AND THEIR USE

[75] Inventors: Helena Twardowska; John J. Cooper, both of Columbus; Yuliy Yunovich, Hilliard, all of Ohio

[73] Assignee: Ashland Inc., Columbus, Ohio

[21] Appl. No.: 762,670

[22] Filed: Dec. 11, 1996

[51] Int. Cl.$^6$ .................................................. C04B 12/04
[52] U.S. Cl. ..................... 106/600; 106/38.3; 106/38.35
[58] Field of Search ..................... 106/600, 38.3, 106/38.35

[56] References Cited

U.S. PATENT DOCUMENTS

| | | | |
|---|---|---|---|
| 4,162,238 | 7/1979 | Bergna | 260/29.6 |
| 4,357,313 | 11/1982 | Harvey et al. | 424/49 |
| 4,504,314 | 3/1985 | Barker et al. | 106/38.35 |
| 5,332,432 | 7/1994 | Okubi et al. | 106/631 |
| 5,474,606 | 12/1995 | Twardowska et al. | 106/632 |
| 5,565,026 | 10/1996 | Hense et al. | 106/600 |

FOREIGN PATENT DOCUMENTS

| | | |
|---|---|---|
| 3159477 | 7/1988 | Japan . |
| 1213374 | 8/1989 | Japan . |
| 1289873 | 11/1989 | Japan . |

*Primary Examiner*—Paul Marcantoni
*Attorney, Agent, or Firm*—David L. Hedden

[57] ABSTRACT

This invention relates to heat curable alumino-silicate binder systems comprising as three separate parts (1) a soluble source of silica, (2) a caustic solution of an alkali silicate, and (3) aluminum silicate, and an alcohol which may be incorporated into (1), (2), or both. The binder systems are mixed with an aggregate to form a mix. The resulting mix is shaped and heated at an elevated temperature to form a cured shape, particularly foundry cores and molds. Heat is applied by warm air, baking in an oven, microwave, or preferably by hot-box equipment.

13 Claims, No Drawings

HEAT CURABLE ALUMINO-SILICATE BINDER SYSTEMS AND THEIR USE

FIELD OF THE INVENTION

This invention relates to heat curable alumino-silicate binder systems comprising as three separate parts (1) a soluble source of silica, (2) a caustic solution of an alkali silicate, and (3) aluminum silicate, and an alcohol, preferably a polyhydric alcohol, which may be incorporated into (1), (2), or (3). The binder components are mixed with an aggregate to form a mix. The resulting mix is shaped and heated at an elevated temperature to form a cured shape, particularly foundry cores and molds. Heat is applied by warm air, baking in an oven, microwave, or preferably by hot-box equipment.

BACKGROUND OF THE INVENTION

U.S. Pat. No. 5,474,606 describes the preparation and use of heat cured alumino-silicate binder for making cores and molds. This binder system gives excellent sand performance with high purity silica sands. However, the performance is not as good with lake sands which contain large amount of various impurities. For instance, the shelf life and the humidity resistance of cores are significantly reduced. Also cores made with this binder tend to be friable on the surface. Since most foundries use lake sands with hot box binder systems, it would be desirable to develop an inorganic hot box binder that can be used efficiently with the lake sands.

SUMMARY OF THE INVENTION

The subject invention relates to heat curable binder systems comprising as three separate components:

(a) a soluble source of silica, (b) a caustic solution of an alkali silicate, and (c) aluminum silicate, and an alcohol which may be incorporated into (a), (b), or (c), preferably (a) or (b).

The binder system is mixed with an aggregate to form a mix. The resulting mix is shaped and cured by heating in one continuous stage with warm air, baking in oven, microwave, and preferably in hot-box equipment Polycondensation of the binder system does not occur when the parts are mixed with an aggregate and shaped, but instead occurs when the shaped mix is heated to temperatures of at least 200° C. to 300° C., preferably 200° C. to 275° C., most preferably 230° C. to 260° C.

$C^{13}$ NMR studies suggest that alcohol is not only a solvent, but is reacted with the other binder components. Shaping mixes prepared with the subject binder systems do not substantially polymerize until heated and have a benchlife of at least five hours.

Shapes prepared with the binder systems show improved immediate strength, strength development over twenty-four hours, humidity resistance, and scratch hardness when compared to binder systems which do not contain an alcohol. Polyhydric alcohols are particularly preferred. The polyhydric alcohols control the rate of dehydration under hot box conditions and prevent excessive drying of shapes during storage at ambient conditions.

The addition of alcohols is particularly useful when lake sands are used as the aggregate. Lake sands contain large quantities of alkaline impurities which react with the source of silica in the binder.

ENABLING DISCLOSURE AND BEST MODE

The subject of this invention relates to binder compositions comprised of two liquid parts and one powder component. Part I consists of colloidal silica solution and Part II contains sodium silicate. Part III, the powder component, is hydrated aluminum silicate. A alcohol is incorporated into the Part I, Part II, or both.

Part I is a colloidal silica solution having solids concentration in the range 40–50%, such as Ludox of DuPont. Part II is a sodium silicate solution having $SiO_2/Na_2O$ ratio in the range 2.0–3.5 and the solids concentration 30–40 weight %. The alcohols are preferably added to the sodium silicate solution. If $SiO_2/Na_2O$ ratio of sodium silicate in the Part II is higher than 2.4 the use of colloidal silica may not be necessary. The binder becomes two part system: one liquid and one solid.

Hydrated aluminum silicate is aluminum silicate which is hydrated with water. Preferably used as the hydrated aluminum silicate is kaolinite which is $Al_2O_3 \cdot 2SiO_2 \cdot 2H_2O$. The hydrated aluminum silicate typically contains water of hydration in the amount of from 1 to 2 moles of water per mole of aluminum silicate, preferably 2 moles of water per mole of aluminum silicate. The particle size of the hydrated aluminum silicate is as low as possible, preferably lower than 0.5 micron. The powder Part is a hydrated aluminum silicate having the $SiO_2/Al_2O_3$ molar ratio of 2:1 and the water content at about 14%.

Preferably the molar ratio of $Na_2O:Al_2O_3$ in the binder is from 0.7:1 to 1.5:1, the molar ratio of $Na_2O:SiO_2$ in the binder is from 0.2:1 to 0.3:1 and the molar ratio of $SiO_2:Al_2O_3$ in the binder is from 3.5:1 to 5.8:1.

For purposes of describing this invention, "alcohol" means monofunctional alcohols, glycols, and polyhydric alcohols. Although the alcohol can be incorporated into the Part I, II, or III, it is preferably added to the sodium silicate solution. If added to the aluminum silicate powder (Part III), the polyhydric alcohol should be in powder form. Although a variety of alcohols can be used, for example xylitol, erythritol, glycerin, glycol, glucose, fructose, pentaerythritol, the best results are obtained with sorbitol. The preferred concentration of sorbitol solution is about 70 weight percent in water.

The binder composition will usually contain 0–15 weight percent colloidal silica, 60–80 weight percent sodium silicate solution having a solids concentration of 35–40 weight percent, 2–15 weight percent alcohol and 15–30 weight percent aluminum silicate powder where said weight percents are based upon the total weight of the binder. The preferred ranges are 5–10 weight percent colloidal silica, 60–70 weight percent sodium silicate solution, 2–10 weight percent alcohol and 15–25 weight percent aluminum silicate.

Other additives, such as surfactants, can be added to silicate solution to improve flowability of the sand mix. Preferably used for this purpose is sodium alkyl naphthalene sulfonate, Petro ULF of Witco.

The aggregate can be any conventional aggregate used in the foundry industry or any refractory used in making shapes from refractory materials. Sand, typically sand which contains at least 70 percent by weight silica, is used as the aggregate. Other suitable aggregate materials include zircon, olivine, alumino-slicate sand, chromite sand, and the like. Sand used for die casting particularly has a fineness grade of 70 to 105 for instance. For making preforms, the preferred aggregate is a ceramic material, preferably alumina, and the amount of binder used is from 4–8 weight percent.

The binder composition is mixed with an aggregate at a binder level of 1–15 percent based on filler (BOF), preferably 2–8 percent. Although the order of mixing of binder components with the aggregate is not critical, it is preferred to mix the colloidal silica solution first, then add aqueous solution of sodium silicate and finally mix the hydrated aluminum silicate. Alternatively, the hydrated aluminum silicate can be mixed first with the aggregate. The curing of the binder is accomplished by condensation and dehydration of the reaction product between sodium silicate and aluminum silicate at elevated temperature. The curing time depends on the temperature and the equipment used. Hot box, warm air/warm box, baking in conventional oven and microwave can be used. With conventional hot box equipment and the temperature range 200°–300° C. the cure time is 30–90 seconds.

The following abbreviations are used in the Examples and Tables which follow:

bos=based on sand
BP=blow pressure (psi)
CH=constant humidity
CT=constant temperature
DT=dwell time (seconds)
Imm.=immediate
PI=Part I (source of colloidal silica)
PII=Part II (source of silicate)
PIII=Part III (source of alumina)
RH=room humidity
RT=room temperature In the Examples below, the colloidal silica solution is first mixed with the aggregate. Then the solution of sodium silicate and alcohol is added. Thereafter, the solid aluminum silicate is added. All letter examples are controls.

Example A is a control which does not employ an alcohol. Examples 1–2 show formulations containing a sorbitol at various concentrations which are used in making foundry shapes with sand.

EXAMPLES 1–2

A mixture containing Wedron 540 silica sand and binder composition as described below was prepared using a paddle mixer Hobart N-50. The cores were made in the shape of dog bones and cured in conventional hot box system. The curing conditions were as follows:

| blow time/pressure | 0.5 sec at 65 psi |
|---|---|
| box temperature | 230° C. (450° F.) |
| dwell time | 50 sec |

The tensile strength of cores was measured with a Thwing-Albert TA 500. The humidity resistance was tested by placing samples which have cured for 24 hrs into a humidity chamber at 25 C. and 99% RH. The tensile strength was measured after 1 hour exposure and is designated as 24+1 hours.

In Example A, no sorbitol was added while Examples 1–2 contained varying amounts of sorbitol. The test conditions and the amount of binder components are described below:

TEST CONDITIONS

Sand Amount: Wedron 540 (4000 parts)

CT[1] Room: 50% Relative Humidity, 25° C.

[1]CT=constant temperature/humidity room, used to store cores that were tested after 5 minutes.

| BINDER FORMULATION | | |
|---|---|---|
| | Example | |
| Component (% bos) | A | 1–2 |
| Colloidal silica | 0.5 | 0.5 |
| Sodium silicate | 2.3 | 2.3 |
| Aluminum silicate | 0.87 | 0.87 |
| Sorbitol | none | see Table |

TABLE I

TENSILE PROPERTIES AND SCRATCH HARDNESS

| | | Tensiles (psi) (zero benchlife) | | Scratch |
|---|---|---|---|---|
| Example | % Sorbitol | 24 hrs. | 24 hrs. + 1 | Hardness |
| A | 0 | 269 | 268 | 63 |
| 1 | 0.15 | 343 | 286 | 65 |
| 2 | 0.25 | 309 | 283 | 67 |

EXAMPLES 3–5

Example 1 was followed except the amount of colloidal silica was varied. Lake sand Nugent 480 was used in these experiments. Sorbitol was not present in Examples B–D, but was added at 0.25% bos in Examples 3–5. The results are shown in Table II.

TABLE II

TENSILE PROPERTIES AND SCRATCH HARDNESS

| Example | % Col. Sil. | Tensiles (psi) | | | | Scratch Hardness |
|---|---|---|---|---|---|---|
| | | Imm. | 1 hr. | 24 hrs. | 24 hrs. + 1 | |
| B | 0 | 33 | 195 | 104 | 17 | 48 |
| 3 | 0 | 49 | 265 | 212 | 101 | 68 |
| C | 0.35 | 51 | 272 | 148 | 31 | 65 |
| 4 | 0.35 | 47 | 287 | 284 | 173 | 70 |
| D | 0.5 | 52 | 242 | 159 | 33 | 63 |
| 5 | 0.5 | 55 | 265 | 264 | 187 | 70 |

EXAMPLES 6–8

Example 1 was followed except different lake sands, Nugent 480 and Manley ILW5, were used. The results are summarized in Table III.

TABLE III

TENSILE PROPERTIES AND SCRATCH HARDNESS WITH NUGENT 480 SAND

| | | Tensiles (psi) (zero benchlife) | | | Scratch |
|---|---|---|---|---|---|
| Example | % Sorbitol | 1 hr. | 24 hrs. | 24 hrs. + 1 | Hardness |
| E | 0 | 242 | 159 | 33 | 63 |
| 6 | 0.15 | 308 | 274 | 133 | 66 |
| 7 | 0.25 | 265 | 264 | 187 | 70 |
| 8 | 0.35 | 333 | 279 | 168 | 69 |

TABLE IV

TENSILE PROPERTIES AND SCRATCH HARDNESS WITH MANLEY 1L5W SAND

| Example | % Sorbitol | Tensiles (psi) (zero benchlife) | | | Scratch Hardness |
|---|---|---|---|---|---|
| | | 1 hr. | 24 hrs. | 24 hrs. + 1 | |
| F | 0 | 234 | 204 | 95 | 54 |
| 9 | 0.15 | 362 | 295 | 209 | 62 |
| 10 | 0.25 | 312 | 264 | 218 | 67 |

EXAMPLES 11–16

Example 1 was followed except different polyhydric (PHA) were used. All additives are used at the same concentration in binder formulation, 0.175% bos. The results are summarized in Table IV. Nugent 480 sand was used.

TABLE V

TENSILE PROPERTIES AND SCRATCH HARDNESS

| Example | PHA | Tensiles (psi) (zero benchlife) | |
|---|---|---|---|
| | | 24 hrs. | 24 hrs. + 1 |
| F | None | 159 | 33 |
| 11 | Sorbitol | 264 | 187 |
| 12 | Xylitol | 298 | 157 |
| 13 | Corn Syrup | 227 | 50 |
| 14 | Glycerin | 187 | 33 |
| 15 | Pentaerythritol | 173 | 54 |
| 16 | meso-Erythritol | 213 | 96 |

The results summarized in Tables I–IV show that the addition of sorbitol improves sand performance of inorganic hot box. The improvements are much greater with lake sands than with silica sand, especially the strength after 24 and 24+1 hrs. The best results are obtained when both colloidal silica and sorbitol are used.

Tables I–IV also show that sorbitol improves the scratch hardness of cores. The friability of cores is also greatly reduced.

We claim:

1. A heat curable foundry binder system comprising as separate components:
   (A) a soluble source of silica,
   (B) a caustic solution of an alkai silicate, and
   (C) aluminum silicate, and
   (D) an alcohol selected from the group consisting of sorbitol, xylitol, meso erythritol, and mixtures thereof, which is incorporated into component (A), (B), or (C), such that the binder mix contains 1–15 weight percent silica, 60–80 weight percent alkali silicate solution having a solids concentration of 35–40 weight percent, 15–30 weight percent aluminum silicate, and 2–15 weight percent alcohol, where said weight percents are based upon the total weight of the binder.

2. The foundry binder system solution of claim 1 wherein the source of silica is colloidal silica, the alkali silicate is sodium silicate, the alcohol is sorbitol, and said sorbitol is added to (A) or (B).

3. The foundry binder system of claim 2 wherein the aluminum silicate has an average particle size of less than 0.5 micron and the hydrated aluminum silicate contains 2 moles water of hydration.

4. The foundry binder system of claim 3 wherein the molar ratio of $Na_2O:Al_2O_3$ in the binder is from 0.7:1.0 to 1.5:1.0, the molar ratio of $Na_2O:SiO_2$ in the binder is from 0.2:1.0 to 0.3:1:0, and the molar ratio of $SiO_2:Al_2O_3$ in the binder is from 3.5:1.0 to 5.8:1.0.

5. The binder system of claim 4 wherein the binder contains from 5–10 weight percent colloidal silica, 60–70 weight percent sodium silicate solution, 2–10 weight percent alcohol and 15–25 weight percent aluminum silicate.

6. A heat-curable mix comprising in admixture:
   (a) aggregate; and
   (b) a binder system of claim 1, 2, 3, 4, or 5.

7. A foundry shape prepared by a process comprising:
   (a) forming a mix by mixing an aggregate with a bonding amount of up to about 10 percent by weight, based upon the weight of the aggregate, of a binder system of claim 1, 2, 3, 4, or 5;
   (b) shaping the foundry mix of (a) into a foundry shape;
   (c) contacting the foundry shape of (b) with a source of heat at a temperature of 200° C. to 300° C.; and
   (d) allowing the foundry shape to harden into a workable foundry shape.

8. A heat curable foundry binder mix consisting essentially of as separate components:
   (A) a soluble source of silica,
   (B) a caustic solution of an alkali silicate, and
   (C) aluminum silicate, and
   (D) an alcohol, wherein said alcohol is incorporated into component (A), (B), or (C), such that the binder mix contains 1–15 weight percent silica, 60–80 weight percent alkali silicate solution having a solids concentration of 35–40 weight percent, 15–30 weight percent aluminum silicate, and 2–15 weight percent alcohol, where said weight percents are based upon the total weight of the binder.

9. The foundry binder system solution of claim 8 wherein the source of silica is colloidal silica, the alkali silicate is sodium silicate, the alcohol is sorbitol, and said sorbitol is added to (A) or (B).

10. The foundry binder system of claim 9 wherein the aluminum silicate has an average particle size of less than 0.5 micron and the hydrated aluminum silicate contains 2 moles water of hydration.

11. The foundry binder system of claim 10 wherein the molar ratio of $Na_2O:Al_2O_3$ in the binder is from 0.7:1.0 to 1.5:1.0, the molar ratio of $Na_2O:SiO_2$ in the binder is from 0.2:1.0 to 0.3:1:0, and the molar ratio of $SiO_2:Al_2O_3$ in the binder is from 3.5:1.0 to 5.8:1.0.

12. The binder system of claim 11 wherein the binder contains from 5–10 weight percent colloidal silica, 60–70 weight percent sodium silicate solution, 2–10 weight percent alcohol and 15–25 weight percent aluminum silicate.

13. The foundry binder mix of claim 2 wherein the binder composition also contains a surfactant.

* * * * *